March 22, 1966  J. D. WALKER  3,242,072
AERATORS WITH WATER-SEALED BLOW-OFF
Filed March 30, 1960
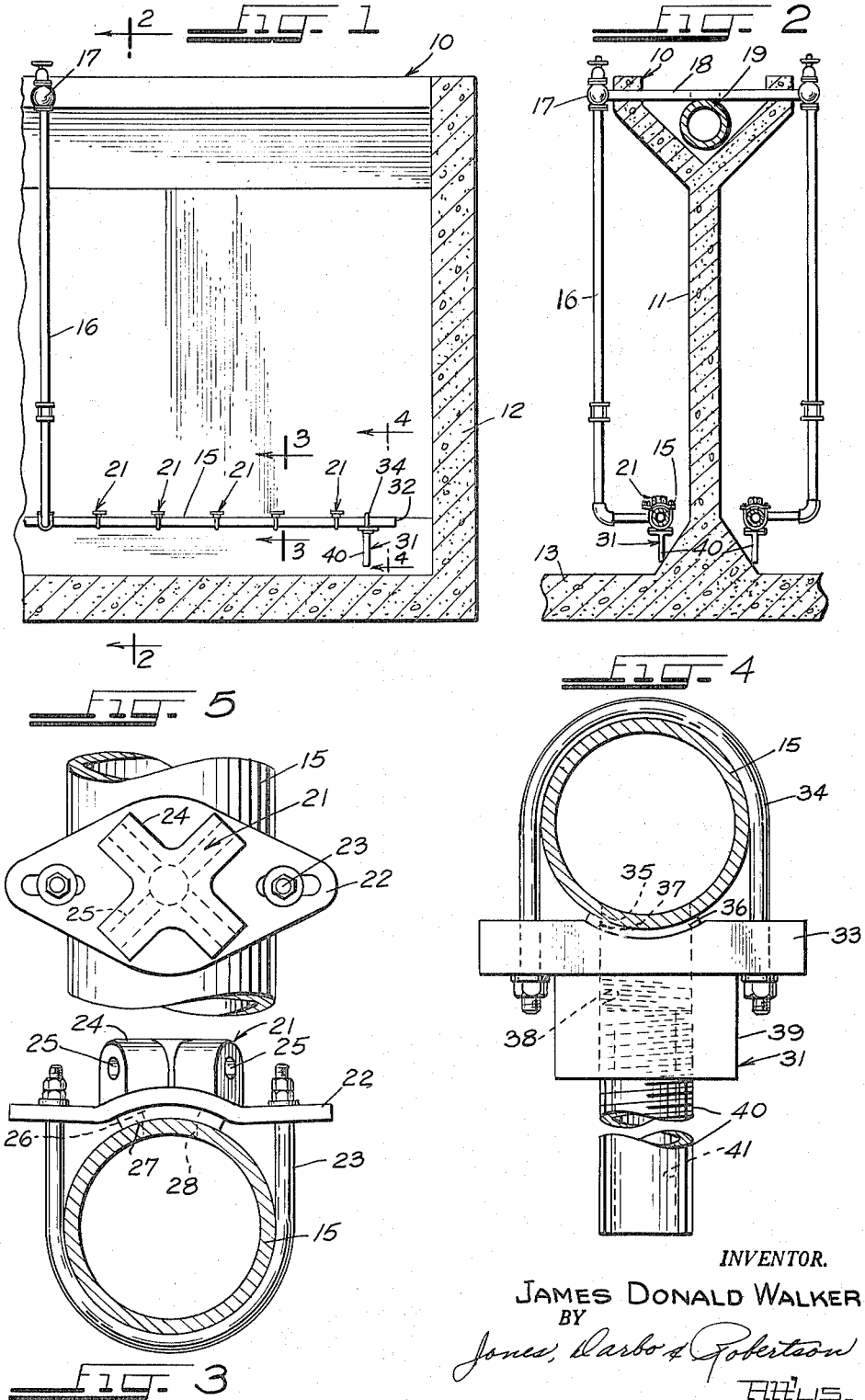
INVENTOR.
JAMES DONALD WALKER
BY
Jones, Darbo & Robertson
ATTYS.

United States Patent Office 3,242,072
Patented Mar. 22, 1966

3,242,072
AERATORS WITH WATER-SEALED BLOW-OFF
James Donald Walker, Aurora, Ill., assignor, by mesne assignments, to Walker Process Equipment, Inc., Wilmington, Del., a corporation of Delaware
Filed Mar. 30, 1960, Ser. No. 18,761
5 Claims. (Cl. 210—15)

One of the steps in the treatment of sewage is the aeration of the liquid sewage by bubbling air through it. While numerous devices are used, in general they employ an air supply header positioned close to the bottom of the tank holding the liquid sewage. On the header are a plurality of air liberator devices, preferably through which the air is discharged to bubble up through the sewage. A suitable air supply means is connected to the header to deliver air thereto.

The use of spargers, properly designed, has proved very satisfactory. One fault has remained, however. When the air supply to the header is discontinued, as will occur from time to time, the header fills up with sewage which enters through the spargers and displaces the air in the header, and in the submerged supply pipe leading to it. The composition of the sewage is primarily liquid in form but there will be a certain amount of solids included therein which will settle on the bottom of the header. Thereafter when the aeration process recommences the air will push the water ahead of it blowing the water out through the spargers. However, if the air has been interrupted long enough to let the solids in the sewage which settled form more or less of a cake on the bottom of the header, some solids would remain there. Over the years there can be a gradual accumulation of a thick layer in the header. In time, the flow of air through the header will be hindered by the accumulation of solids in the lower portion of the header.

A further problem resulting from the deposit of the solids in the bottom of the header is that from time to time some of the solids may tend to plug some of the air discharge ports in the spargers. The deposit of solids in the bottom of the header, particularly when they are dried by the passage of air thereover, may tend to agglomerate into units sufficiently large, that if they become displaced and pushed up into the sparger openings, they may actually block those openings.

I have devised a method and apparatus for automatically cleaning out the air supply header at the time that air is re-supplied to that header to recommence the aeration process. In my invention the liquid sewage is pushed out by the air through a blow-out located in the bottom of the header. The movement of the liquid along and out of the bottom of the header will carry with it any solids that have settled to the bottom of the header. At the same time the majority of the liquid is discharged through the blow-out rather than through the sparger orifices.

An important feature of my invention is that this blow-off of sewage from the header occurs automatically when air is re-supplied to the header. No valves or other moving parts are necessary to put the blow-off into operation. At the same time, upon the completion of the blow-off of the sewage from the header there is no loss of air from the header through the blow-off structure. Despite the fact that the air in the header is under pressure a seal is formed, which seal without the use of any valves or other moving parts, automatically prevents the discharge of air from the header except through the sparger openings.

The method I have devised is to establish an enclosed passage extending downwardly from the header. This passage opens into the sewage tank at the bottom of the passage, and the top of the passage communicates with the lower interior of the header. The vertical downward length of the passage from the bottom of the header is such that the liquid pressure in the tank at the bottom, open, end of the passage is greater than the air pressure in the header during the time that the aeration process is being carried out. Thus, any liquid sewage in the header will be pushed out of the header and expelled into the tank through the passage when the header is supplied with air. When that is completed however, the liquid sewage about the lower end of the passage will form a liquid seal to prevent the loss of air from the header through the passage.

It is particularly advantageous to carry out my process by establishing the blow-off passage at a point along the header, which point is spaced from the position along the header at which the air is supplied to the header. The air for aeration purposes is then released from the header intermediate the two points at which the air is supplied and at which the liquid sewage is discharged from the header. This insures a better cleaning of the header when it is first supplied with air, and prevents the trapping of sewage in dead spots in the header.

In the apparatus I have illustrated for carrying out this method the blow-off is located at the end of the header remote from the point on the header at which the riser supplying air or other gas is connected. It can also be located on the header intermediate the two points at which gas supply risers are connected to the header, or directly below a sparger if there is only one. When there are several gas diffusers they are positioned intermediate the blow-off and the point or points at which the supply risers are connected to the header. The blow-offs comprise a conduit extending downwardly from the header with the conduit defining a passage, which at its upper end is in communication with the bottom interior of the header, and at its lower end is open into the sewage tank. The vertical height of the passageway is such that the liquid sewage about the bottom of the passageway will form a seal to prevent loss of gas through the passageway after the header has been cleared of sewage.

Most desirably no air will be released through the bottom of the blow-off passage. It is possible in some instances that the blow-off could be constructed so that only a minimal amount of air was released through the bottom of the passage. In such a case the liquid pressure at the bottom of the passage would be only slightly less than the air pressure in the header, or, to put it another way, the liquid pressure at the bottom of the passage is at least substantially equal to the air pressure in the header. The term substantially is employed in recognition of the fact that it might be just slightly less so as to permit a minimal escape of air from the passage. As has previously been mentioned, this is not particularly desirable and normally the liquid pressure at the bottom of the passageway will be in excess of the air pressure in the header.

Additional objects and advantages of the invention will be apparent from the following descriptions of the drawings in which:

FIGURE 1 is a vertical section through a portion of a sewage treatment tank illustrating an embodiment of my invention therein;

FIGURE 2 is a partial section taken at line 2—2 of FIG. 1;

FIGURE 3 is an enlarged section taken at line 3—3 of FIG. 1 and illustrating a sparger on the air supply header;

FIGURE 4 is an enlarged section as viewed at line 4—4 of FIG. 1 and illustrating a blow-off of my invention; and FIGURE 5 is a plan view of the sparger of FIG. 3.

Referring to FIGS. 1 and 2, there is there illustrated a sewage treatment tank generally 10 only a portion of which is illustrated. FIG. 2 shows a side wall 11 which is a common wall between tank 10 and a corresponding tank in juxtaposition thereto. Of course, there are other walls to tank 10 including end wall 12 and base 13. The tank would have conventional features such as inflow means for raw sewage and return activated sludge, and outflow means maintaining the tank nearly full.

Extending along adjacent the base 13 is an air supply header or sparger header 15. At spaced points along header 15 are air supply risers 16. Each riser 16 connects through a valve 17 and a pipe 18 to an air supply main 19. Pipes 18 extend through openings in an overhanging portion of the side wall 11 and may serve to support risers 16 and header 15, although the latter may rest on supports.

At spaced points along header 15 are a plurality of spargers generally 21. In the illustrated embodiment, the spargers include a base 22 which is clamped to header 15 by U bolts 23. A cross shaped member 24 extends from the top of base 22 and has four air outlets or orifices 25 in the arms of the cross respectively. Through internal openings, orifices 25 communicate with the central opening in base 22. This central opening in base 22 is immediately above the opening 26 in a gasket 27. In turn, opening 26 is centered over a hole 28 in header 15. Thus, air from the interior of header 15 is free to flow through the sparger and out orifices 25.

The blow-off, generally 31, is best seen in FIG. 4. In FIG. 1 it will be seen that one is located adjacent one closed end 32 of the header. Both ends of header 15 are closed as by means of a removable end plate, a pipe plug or the like, and preferably both ends have a blow-off 31 if riser 16 connects at the center of header 15. In the event that two or more risers 16 are connected to header 15 a blow-off 31 will preferably be located midway between each adjacent pair of risers, as well as adjacent the end of the header that supplies spargers outwardly of the risers.

Blow-off 31 is shown as including a saddle base member 33 clamped to header 15 by a U bolt 34. Base member 33 is centered about a hole 35 in the bottom header 15 with a gasket 36 being interposed between header 15 and member 33. Gasket 36 similarly has a hole 37 extending therethrough. Welding can be used for both securing and sealing, omitting bolt 39 and gasket 36.

Aligned with holes 35 and 37 is an internally threaded opening 38 in base 33 as well as in the boss 39 extending downwardly from base 33. Threaded into opening 38 is a pipe 40 which has an opening 41 extending longitudinally therethrough. It will be seen that openings 35, 37, 38 and 41 form a passage extending from the bottom interior of header 15 and opening into tank 10 at the bottom of pipe 40.

The blow-off may also be in the form of an elbow at the end of the header, and a downwardly extending pipe thereon. This facilitates use of the same size down flow as the header, for maximum speed of blow-off.

The orifices 25 in spargers 21 are likely to be about 5/16 of an inch in diameter, but they may range from about 1/8 inch to 3/8 of an inch. It is important in the operation of the spargers to maintain an air velocity of over 70 feet per second to prevent "creeping in" of the liquid sewage, and resultant growths. Usually the volume of air desired maintains an air velocity through the orifices of approximately 175 to 200 feet per second, and to accomplish this the air pressure in the header 15 normally will be equivalent to about 8 to 10 inches of water. In such a case if the bottom end of pipe 40 is about 12 inches below the center line of header 15 there will be an adequate liquid seal maintained about the bottom of pipe 40 to prevent the loss of air at the bottom of the passageway through that pipe. Since header 15 normally will be located from about 18 to about 24 inches above the bottom 13 of tank 10 there is ample room for a pipe 40 of the described length to be inserted below header 15. As a matter of fact, pipe 40 could be increased in length and still remain above the bottom 13 of the tank, but there is no particular advantage in doing so unless it is desired to raise the air pressure within header 15. Pipe 40 may slant, if necessary, and should have a substantially non-impeding environment at its discharge end.

The exact structure of spargers 21 is not a feature of the present invention. Other forms of diffusers, which might be of the orifice, porous diffuser, etc., type can be employed in connection with the present invention. With some such devices it is necessary to provide additional air pressure within the interior of header 15, especially as they clog. However, as has been previously pointed out this readily may be accomplished by extending the vertical height of pipe 40. Use of this invention with porous diffusers will reduce the exterior clogging thereof, since inward flow of liquid will be substantially eliminated. However, spargers 21 are greatly preferred. Their non-clogging characteristics are extremely valuable even without this invention, and in using this invention permit a minimum factor of safety and hence minimum cost.

The fact that risers 16 also fill with liquid to the level of the liquid in the tank is doubly beneficial. It balances the head of water opposing outflow, and hence the entire air pressure is initially available to move the water and force it through the blow-off passage, so that it flows fast, with a scouring effect. Also, the solids largely settles from the upper portion of risers 16, leaving a substantial amount of relatively clear water to flush out the last residue of the liquid carrying a higher percentage of solids. There are some constructions in which no header is provided, orifices being around the foot of the riser. Here the very start of the air supply pushes almost all of the settled sludge at the bottom of the riser straight down through the blow-off passage 41 and all of the rest of the water is relatively clear. This type of construction is more fully disclosed and is specifically claimed in applicant's application Serial No. 151,950 filed November 13, 1961. Where there is a header, however, the longer period in which solids are carried by the water may be advantageous in that the moving solids may have a scouring effect to dislodge any solids tending to cling to the inside of the header.

The materials from which the blow-off 31 is formed will depend upon the application and the preferences of the particular manufacturer and user. Normally, the saddle member 33 with the boss 39 will be a metal casting. Gaskets 36 will be a chloroprene rubber such as that sold under the trademark Neoprene. Pipe 40 can be pipe galvanized after threading, but at present is preferably formed of a plastic pipe such as the plasticized, highly polymerized, vinyl chloride plastic pipes sold under the trademark Koroseal. This is stiff enough not to be swung up by buoyancy when air-filled. The diameter of passage 41 is preferably such as to give a resistance to the flow of liquid through it, less than ½ and ideally less than ¼ of that through the spargers which it bypasses. A 1¼" blow-off passage has been found suitable for a 3" header.

If the air supply to header 15 is cut off, such as by the closing of valves 17, the header will fill with sewage. When the air supply is re-established, the aid will push the sewage ahead of it along header 15 with the majority of the sewage being discharged through the passageway extending out through pipe 40. Since all of the sewage will be moving, including the sewage along the bottom of header 15, the movement of the sewage will sweep out any solids that have settled along the bottom of the header. The air will push down through the passageway extending through pipe 40 to a level at which the air pressure is balanced by the liquid pressure along pipe 40. Since pipe 40 extends downwardly into tank 10, for a distance more than sufficient for such a balance to be achieved, once the balance has been achieved there will still remain a liquid seal in the bottom of the passageway extending through pipe 40. Of course, as the sewage is driven through header 15 past each of spargers 21, the spargers will go into operation in discharging air into the sewage in tank 10.

Although the foregoing disclosure offered for public dissemination is detailed to insure adequacy and aid understanding, this is not intended to prejudice that purpose of a patent which is to cover each new inventive concept therein, no matter how others may later disguise it by variations in form or additions or further improvements. The following claims are intended as the chief aim toward this purpose, as it is these that meet the requirement of pointing out the points, improvements, or combinations in which the inventive concepts are found.

I claim:

1. Aeration apparatus for a liquid tank in a waste treatment plant comprising: a sparger header positioned generally horizontally below the surface of the liquid in said tank; means connected to one point on said header to supply air to said header at a given pressure in said header; a conduit extending downwardly from a second point on said header and defining a passageway in communication with the lower portion of the header at the upper end of the passageway and open at the lower end of the passageway, said second point on said header being spaced along said header, from the first point, the vertical height of said passageway being such that the liquid pressure at the lower end of the passageway is at least substantially equal to said given pressure; and a plurality of spargers having openings with a transverse dimension of the order of at least one-eighth inch, communicating with the top of said header between said two points, and said openings each lying substantially in a plane too steep for solids to fall by gravity into or across said openings.

2. The method of operating a submerged blast apparatus (said apparatus having a pipe system including a supply pipe extending downwardly to a substantial depth in a tank, orifices at one level having a transverse dimension of the order of at least one-eighth inch, communicating with the pipe with a region of upward flow from the pipe toward the orifices, and a lower level blow-off opening) which includes the steps of causing a sustained blast through the orifices into a liquid-solids mixture in the tank by supplying a gaseous medium through the supply pipe at an effective pressure which is between the hydrostatic heads in the tank at said two levels, temporarily discontinuing the blast by discontinuing the supply of the medium, letting the liquid-solids mixture in the tank enter the supply pipe, and rise a substantial height therein above the orifices to the level within the tank, maintaining said apparatus intact, in the tank and unaltered, while permitting solids therein to settle downwardly, until a blast is again desired, and thereupon resupplying the medium through the supply pipe at such pressure, thereby washing solids out through the blow-off opening, first as a slurry with liquid from their vicinity and finally with liquid which rose in said supply pipe and has been relatively clarified by settling of solids between periods of blast.

3. Submerged blast apparatus for liquids having solids therein, including a gas supply conduit extending a substantial distance downwardly from a supply connection, gas liberation means having discharge openings of a transverse dimension of the order of at least one-eighth inch, communicating with the lower portion of said conduit through passages extending upwardly therefrom, and opening at a level to be submerged a substantial distance in the liquid, and blow-off passage means communicating with the conduit and gas liberation means at the lower portion thereof, extending downward, and open only at a level far enough below said level to be sealed by the increased liquid pressure when the submerged blast apparatus is operating normally, said blow-off passage means communicating freely with the conduit below said passages and having less than half the flow resistance to the liquid that the gas liberating means provides, whereby liquid with solids therein entering the conduit during an idle period and rising therein will be partially clarified by settling of the solids downwardly so that, upon restoration of gas pressure, initially relatively concentrated solids will be washed out predominantly through the blow-off passage means, and will be followed by the partially clarified liquid.

4. Submerged blast apparatus for liquids having solids therein, including a gas supply conduit extending a substantial distance downwardly from a supply connection, gas liberation means communicating with the lower portion of said conduit through passages extending upwardly therefrom, and opening at a level to be submerged a substantial distance in the liquid, and blow-off passage means communicating with the conduit and gas liberation means at the lower portion thereof, extending downward, and open only at a level far enough below said level to be sealed by the increased liquid pressure when the submerged blast apparatus is operating normally, said blow-off passage means communicating freely with the conduit below said passages, whereby liquid with solids therein entering the conduit during an idle period and rising therein will be partially clarified by settling of the solids downwardly so that, upon restoration of gas pressure, initially relatively concentrated solids will be washed out through the blow-off passage means, and will be followed by the partially clarified liquid, the gas liberation means being of a clog-resisting type having straight orifice passages of a transverse dimension of the order of at least one-eighth inch.

5. Submerged blast apparatus for liquids having solids therein, including a gas supply conduit extending a substantial distance downwardly from a supply connection, gas liberation means having gas outlets therein with a transverse dimension of the order of at least one-eighth inch, communicating with the lower portion of said conduit through passages connecting with the conduit at points above the bottom area thereof, and opening at a level to be submerged a substantial distance in the liquid, and blow-off passage means communicating with the conduit and gas liberation means at the lower portion thereof, extending downward, and open only at a level far enough below said level to be sealed by the increased liquid pressure when the submerged blast apparatus is operating normally, said blow-off passage means communicating freely with the conduit below said passages, whereby liquid with solids therein entering the conduit during an idle period and rising therein will be partially clarified by settling of the solids downwardly so that, upon restoration of gas pressure, initially relatively concentrated solids will be washed out through the blow-off passage means, and will be followed by the partially clarified liquid.

References Cited by the Examiner

UNITED STATES PATENTS

| 1,214,637 | 2/1917 | Zistel | 261—124 |
| 2,869,844 | 1/1959 | Thomas | 261—124 X |
| 2,917,295 | 12/1959 | Hauer | 261—124 |

FOREIGN PATENTS

| 195,355 | 1/1958 | Austria. |
| 571,970 | 1/1958 | Italy. |

OTHER REFERENCES

"The Combined Complete Treatment of Medium and High Concentration Wastes," article by E. B. Mallory in Water Works and Sewerage, vol. 89, No. 4, April 1942, page 146 relied on.

HARRY B. THORNTON, *Primary Examiner.*

NORMAN YUDKOFF, HERBERT L. MARTIN,
*Examiners.*